Patented Jan. 19, 1954

2,666,754

UNITED STATES PATENT OFFICE 2,666,754

REACTION PRODUCT OF SILICON MONOXIDE AND AMMONIA AND RUBBER COMPOSITIONS CONTAINING THE SAME

Daniel S. Sears, Cuyahoga Falls, Ohio, assignor to The B. F. Goodrich Company, New York, N. Y., a corporation of New York No Drawing. Application May 26, 1950, Serial No. 164,619

17 Claims. (Cl. 260—41.5)

1

This invention relates to a novel composition of matter comprising inorganic materials identical with the reaction products obtained by reacting gaseous silicon monoxide with ammonia and the method of making the novel composition of matter.

It is an object of this invention to provide a novel composition of matter which is useful as a reinforcing pigment for rubbery compositions.

Another object of this invention is to provide a method of forming a novel composition of matter which is suitable as a rubber reinforcing pigment in reinforcing white and light-colored rubbery compositions and which does not discolor a white or light-colored rubbery composition to which it is added.

Still another object of this invention is to provide a white, finely-divided reinforcing pigment for rubbery compositions.

Other objects of this invention will be apparent from the description which follows.

Throughout the rubber industry it has been found necessary to incorporate into rubbery compositions reinforcing pigments which function to increase the hardness, stiffness, resistance to abrasion, cutting and tearing, and strength of the vulcanized compositions. It is not fully understood whether the properties which rubber reinforcing pigments impart to the vulcanized rubbery compositions are the result of physical or chemical phenomena or in a combination of both.

Carbon blacks are generally incorporated into rubbery compositions to impart to these compositions the desired reinforcing properties mainly because carbon black reinforcing pigments have been the most satisfactory known reinforcing pigments readily available. Because of the increasing demand for white and light-colored rubbery articles, carbon black reinforcing pigments are unable to satisfy all of the requirements for a reinforcing pigment. Furthermore, it is doubtful whether the carbon black industry can continue to supply the vast quantities of carbon black reinforcing agents demanded, since the raw materials from which carbon blacks are produced are rapidly being depleted.

I have found a novel composition of matter comprising inorganic materials identical with the reaction products obtained by reacting gaseous silicon monoxide and ammonia with each other, which reaction products are excellent rubber reinforcing pigments when incorporated with a rubbery material. A reinforcing pigment made

2 in accordance with this invention may be almost pure white permitting it to be incorporated into white or light-colored rubbery compositions without irreparably discoloring the rubbery compositions.

The preparation of silicon monoxide is well known in the art being described in various literature references including U. S. Patent No. 875,286 to Potter; U. S. Patent No. 908,131 to Potter; U. S. Patent No. 1,104,384 to Potter; U. S. Patent No. 1,850,286 to Mittasch et al.; and U. S. Patent No. 2,333,948 to Muskat. A preferred method of forming gaseous silicon monoxide is to mix a solid silicon-bearing material, such as relatively pure silica sand, with a powdered carbonaceous fuel and to heat the mixture in a furnace or in an electric arc in an atmosphere having a relatively low oxygen content, the gaseous silicon monoxide being formed as a reaction product.

Upon the reaction of gaseous silicon monoxide with ammonia, a polymeric silicon oxyimide having the empirical formula $(SiONH)_x$, where $x$ is an integer, is formed.

The reaction products obtained by the reaction of gaseous silicon monoxide with ammonia are excellent reinforcing pigments for rubbery compositions imparting to the rubbery compositions physical properties and characterics generally equivalent to those obtained when reinforcing the rubbery compositions with carbon black. To impart optimum reinforcing characteristics it is preferable that reaction products having an average particle size of from 5 to 200 millimicrons be used.

Silicon monoxide-ammonia reaction products may be incorporated as a rubber reinforcing ingredient into any rubbery composition which is capable of being reinforced with carbon blacks. Among the rubbery materials capable of reinforcement are natural rubber, such as caoutchouc and the like which is essentially a conjugated polymer of isoprene, or synthetic rubber, such as the rubbery polymers of open-chain conjugated dienes having from 4 to 8 carbon atoms exemplified by butadiene-1,3; 2,3-dimethyl butadiene-1,3; 1,4-dimethyl butadiene-1,3 and the like, or the rubbery copolymers of these and similar conjugated diolefins with each other or with copolymerizable monomeric materials containing a single ethylenic linkage, such as acrylonitrile, styrene, methyl acrylate, ethyl acrylate, methyl methacrylate, ethyl methacrylate, isobutylene, or similar materials, or the rubbery polymers of other conjugated dienes, such as chloroprene and the like.

Although small quantities of a silicon monoxide-ammonia reaction product impart some reinforcing properties to rubbery compositions to which it is added, it is necessary, in order to obtain optimum properties and characteristics in reinforced rubbery compositions, to incorporate in the rubbery composition preferably from 40 to 80 parts by weight of a silicon monoxide-ammonia reaction product based on 100 parts by weight of rubbery material.

The following examples are intended merely as illustrations of this invention, and it will be understood that the examples are not intended to limit the scope of the invention.

EXAMPLE 1

A mixture of relatively pure silica sand and ground carbonaceous fuel is heated in an electric arc furnace having an atmosphere which has a relatively low oxygen concentration. The gaseous combustion products which contain gaseous silicon monoxide are discharged immediately after formation into a reaction chamber having an atmosphere which has a high concentration of gaseous ammonia, substantially free from oxygen. Preferably the molar ratio of ammonia to gaseous silicon monoxide in the reaction chamber is maintained at about 1:1, although an excess of either reagent may be employed. In order to obtain a product as nearly free from particles of silica as possible, it is preferable that an excess of ammonia be present, up to 10% by weight or more.

The ammonia and the gaseous silicon monoxide present in the gaseous products of combustion react rapidly to form a finely-divided generally light-colored to blue-white material resembling amorphous silica in appearance and having a density of from approximately 2.25 to 2.60 grams per cubic centimeter at 30° C. X-ray diffraction analysis indicates that the silicon monoxide-ammonia reaction product is a new composition of matter comprising polymeric silicon oxyimide as evidenced by a "halo" pattern indicating an amorphous material having a predominant interatomic spacing of approximately 3.70 Ångstrom units. Upon heating the silicon monoxide-ammonia reaction product in air at a temperature of approximately 1,000° C. for 15 hours, the reaction product is decomposed and the solid particulate material remaining after the heating process is silica.

A typical example of a rubbery composition embodying my invention using natural rubber as the rubbery material is as follows:

Material

| | Parts by weight |
|---|---|
| Natural rubber | 100.0 |
| Silicon monoxide-ammonia reaction product | 70.0 |
| Zinc oxide | 5.0 |
| Sulfur | 3.0 |
| Stearic acid | 1.5 |
| Di-dodecylamine | 2.0 |
| Pine tar | 1.0 |
| Phenyl beta naphthyl amine | 1.0 |
| 2-mercapto benzothiazole | 1.0 |
| Total | 184.5 |

The rubber and compounding ingredients were mixed in the usual manner on a roll mill. The rubbery composition was vulcanized in a mold at 280° F. for varying lengths of time. The following data indicate the tensile strength, at 300% elongation and at rupture, of the testing sample, and the elongation value at the time of rupture:

| Vulcanization Time at 280° F. | 300% Modulus, p. s. i. | Tensile Strength at Breaking Point, p. s. i. | Elongation at the Break, percent |
|---|---|---|---|
| 10 min | 810 | 3,600 | 600 |
| 15 min | 900 | 3,380 | 525 |
| 30 min | 1,080 | 3,200 | 525 |
| 45 min | 1,080 | 2,780 | 500 |
| 60 min | 1,070 | 2,950 | 530 |
| 120 min | 880 | 3,000 | 590 |

EXAMPLE 2

The silicon monoxide-ammonia reaction product may be formed as in Example 1.

The following rubber recipe is another typical example of a rubbery composition embodying this invention:

Material

| | Parts by weight |
|---|---|
| Natural rubber | 100.0 |
| Silicon monoxide-ammonia reaction product | 65.0 |
| Zinc oxide | 5.0 |
| Sulfur | 3.0 |
| Di-dodecylamine | 2.0 |
| Stearic acid | 1.5 |
| Pine tar | 1.0 |
| Phenyl beta naphthyl amine | 1.0 |
| 2-mercapto benzothiazole | 1.0 |
| Total | 179.5 |

The rubber was placed on a roll mill and the rubber compounding ingredients were incorporated in the usual manner. The rubber composition was vulcanized in a mold maintained at a temperature of 280° F. for varying lengths of time and the following data were obtained upon testing the vulcanized samples:

| Vulcanization Time at 280° F. | 300% Modulus, p. s. i. | Tensile Strength at Breaking Point, p. s. i. | Elongation at the Break, percent |
|---|---|---|---|
| 15 min | 890 | 4,200 | 650 |
| 30 min | 990 | 3,800 | 630 |
| 45 min | 810 | 3,200 | 635 |
| 60 min | 890 | 3,570 | 620 |
| 90 min | 780 | 3,320 | 635 |

EXAMPLE 3

The silicon monoxide-ammonia reaction product may be formed as in Example 1.

A typical example of a rubbery composition embodying the silicon monoxide-ammonia reaction product and using synthetic rubber as the elastomeric material is as follows:

Material

| | Parts by weight |
|---|---|
| Rubbery butadiene-styrene copolymer (GR-S) 72% conversion | 100.0 |
| Silicon monoxide-ammonia reaction product | 65.0 |
| Zinc oxide | 5.0 |
| Palm oil | 1.0 |
| Stearic acid | 1.5 |
| Tetraethyl thiuram disulfide | 4.5 |
| Total | 177.0 |

The composition was prepared by mixing the ingredients in the usual manner and vulcanizing the composition in a mold at 290° F. for 130 minutes. A vulcanized product having excellent reinforced physical properties, as indicated by tensile strength and elongation measurements, was obtained.

Rubbery compositions reinforced with silicon monoxide-ammonia reaction products may be white in color and may be fabricated into any desired configuration by processes commonly employed in the rubber industry for fabricating rubbery articles.

It is clear that obvious modifications and variations may be made without departing from the spirit and scope of my invention as defined in the appended claims.

I claim:

1. A finely-divided amorphous composition of matter comprising a polymeric silicon oxyimide.

2. A finely-divided amorphous composition of matter comprising a polymeric silicon oxyimide, said composition of matter having an average particle diameter of from 5 to 200 millimicrons.

3. The method of making a finely-divided amorphous composition of matter comprising reacting gaseous silicon monoxide with ammonia in an atmosphere substantially free from oxygen.

4. An elastomeric composition comprising a rubbery conjugated diene polymer and a finely-divided amorphous composition of matter comprising a polymeric silicon oxyimide.

5. An elastomeric composition comprising a rubbery conjugated diene polymer and a finely-divided amorphous composition of matter comprising a polymeric silicon oxyimide, said composition of matter having an average particle diameter of from 5 to 200 millimicrons.

6. An elastomeric composition comprising 100 parts by weight of a rubbery conjugated diene polymer and from 40 to 80 parts by weight of a finely-divided amorphous composition of matter comprising a polymeric silicon oxyimide.

7. An elastomeric composition comprising 100 parts by weight of a rubbery conjugated diene polymer and from 40 to 80 parts by weight of a finely-divided amorphous composition of matter comprising a polymeric silicon oxyimide, said composition of matter having an average particle diameter of from 5 to 200 millimicrons.

8. The method of making a vulcanized rubbery composition comprising uniformly dispersing a finely-divided amorphous composition of matter comprising a polymeric silicon oxyimide into a rubbery conjugated diene polymer, and vulcanizing the composition.

9. The method of making a vulcanized rubbery composition comprising dispersing uniformly into a rubbery conjugated diene polymer a finely-divided amorphous composition of matter comprising a polymeric silicon oxyimide, said composition of matter having an average particle diameter of from 5 to 200 millimicrons, and vulcanizing the composition.

10. The method of making a vulcanized rubbery composition comprising dispersing uniformly into 100 parts by weight of a rubbery conjugated diene polymer from 40 to 80 parts by weight of a finely-divided amorphous composition of matter comprising a polymeric silicon oxyimide, and vulcanizing the composition.

11. The method of making a vulcanized rubber composition comprising dispersing uniformly into 100 parts by weight of a rubbery conjugated diene polymer from 40 to 80 parts by weight of a finely-divided amorphous composition of matter comprising a polymeric silicon oxyimide, said composition of matter having an average particle diameter of from 5 to 200 millimicrons, and vulcanizing the composition.

12. The method of making a finely-divided amorphous composition of matter comprising reacting gaseous silicon monoxide and an excess molar quantity of gaseous ammonia together in an atmosphere substantially free from oxygen.

13. A finely-divided amorphous composition of matter having a density from approximately 2.25 to 2.60 grams per cubic centimeter at 30° C. and comprising a polymeric silicon oxyimide having a predominant interatomic spacing of approximately 3.70 Ångstrom units.

14. An elastomeric composition comprising a rubbery conjugated diene polymer and a finely-divided amorphous composition of matter having a density from approximately 2.25 to 2.60 grams per cubic centimeter at 30° C. and comprising a polymeric silicon oxyimide having a predominant interatomic spacing of approximately 3.70 Ångstrom units.

15. A finely-divided amorphous composition of matter comprising a polymeric silicon oxyimide having a predominant interatomic spacing of approximately 3.70 Ångstrom units.

16. A finely-divided amorphous composition of matter comprising a polymeric silicon oxyimide, said composition of matter having an average particle diameter from 5 to 200 millimicrons and having a density of from approximately 2.25 to 2.60 grams per cubic centimeter at 30° C.

17. An elastomeric composition comprising a rubbery conjugated diene polymer and a finely-divided amorphous composition of matter comprising a polymeric silicon oxyimide having a premodinant interatomic spacing of approximately 3.70 Ångstrom units, and having an average particle diameter from 5 to 200 millimicrons and having a density of from approximately 2.25 to 2.60 grams per cubic centimeter at 30° C.

DANIEL S. SEARS.

References Cited in the file of this patent

UNITED STATES PATENTS

| Number | Name | Date |
|---|---|---|
| 2,428,252 | Von Stroh | Sept. 30, 1947 |